UNITED STATES PATENT OFFICE.

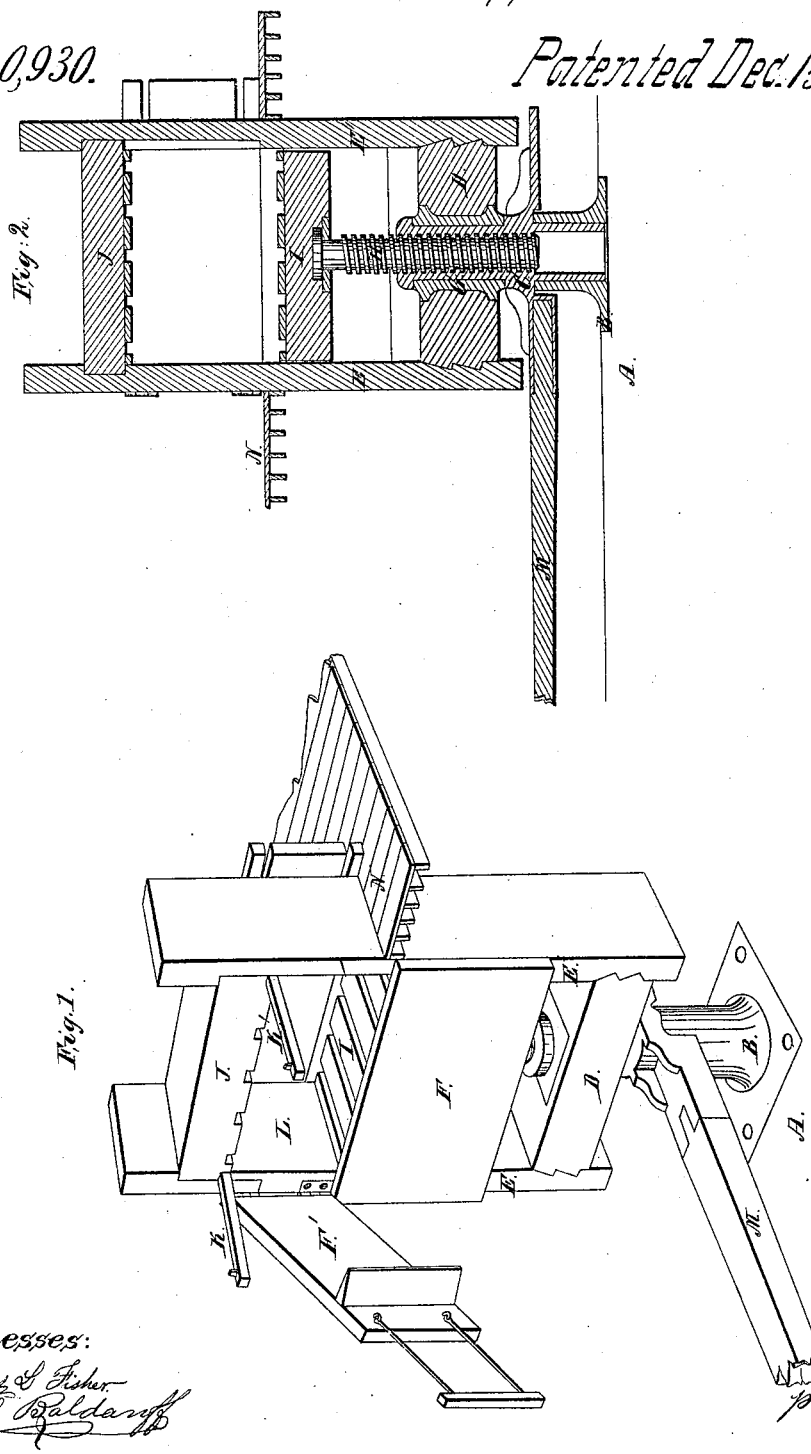

GEORGE W. HART, OF AURORA, INDIANA.

IMPROVEMENT IN HAY AND COTTON PRESSES.

Specification forming part of Letters Patent No. 40,930, dated December 15, 1863.

*To all whom it may concern:*

Be it known that I, GEORGE W. HART, of Aurora, Dearborn county, Indiana, have invented a new and useful Improvement in Vertical Hay-Presses; and I do hereby declare the following to be a full, clear, and exact description thereof, reference being had to the accompanying drawings, making part of this specification.

My invention relates to a mode of constructing presses for baling hay or other fibers by the upward motion of a follower or piston, the same being securely supported and efficiently operated without either bridge or pit.

Figure 1 is a perspective view of a press embodying my invention. Fig. 2 is an axial section thereof.

A represents a bed of masonry, which affords support and anchorage for my pedestal B, the same consisting of a hollow vertical cylinder having a foot or flange, by which it is anchored or otherwise secured to the bed A. The pedestal B is both a support and a socket for a nut, C, which in turn serves to uphold the entire superstructure. The beam D of the frame D E E' F is bushed, G, to receive the nut C, which contains a screw, H, surmounted by a follower or piston, I. The abutment J may be capable of being slid out on ways K, so as to facilitate the feeding or charging of the box L, or may be of the beater kind, as in the "Hewitt" and other presses of that description. The stanchions E E' are upheld on the pedestal B and nut C at such distance from the ground as to permit the free movement beneath them of the sweep M, without the necessity of a pit for the team, while at the same time obviating the necessity of the cumbrous and costly "bridging," now commonly employed for the suspension of those press-frames which hang clear of the ground. The only additional support required beyond that afforded by the pedestal is against a tendency of the press to rotate upon its axis when the sweep M is in operation, which may be prevented by attaching the frame to the usual charging floor or platform, N.

I have selected to illustrate my improvement a form which in practical use I have found to be effective; but do not propose to restrict the invention to the precise arrangement selected so long as an elevated press-frame is employed supported directly or ultimately from or upon the pedestal, or some substantial equivalent therefor. For example, the beater D may rest directly upon the pedestal, and this whether the power employed be that of a nut and screw, as above, or any customary mechanical equivalent—such as a toggle, a cam, a pinion and segment, or other device.

I claim herein as new and of my invention—

The mode of supporting the frame of a vertical hay-press clear of the ground by means of the pedestal B and nut C, or their equivalents, substantially as and for the purposes set forth.

In testimony of which invention I hereunto set my hand.

GEORGE W. HART.

Witnesses:
 GEO. H. KNIGHT,
 CHARLES L. FISHER.